No. 814,036. PATENTED MAR. 6, 1906.
L. GERARD.
PROCESS AND APPARATUS FOR TESTING WATER FOR DECOLORATION.
APPLICATION FILED JUNE 14, 1905.
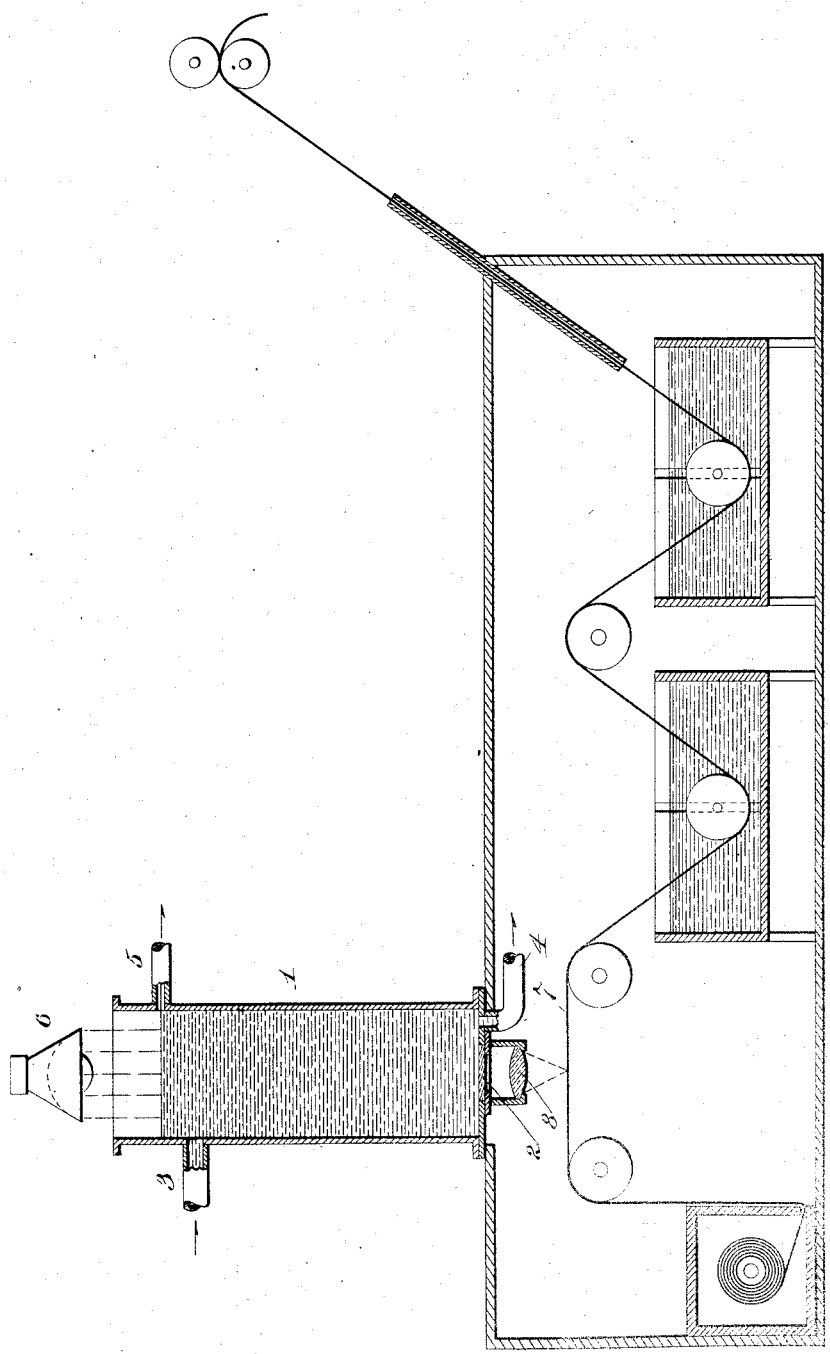
Witnesses:
Inventor

UNITED STATES PATENT OFFICE.

LÉON GERARD, OF BRUSSELS, BELGIUM, ASSIGNOR TO PERCY THOMPSON, OF EAST ORANGE, NEW JERSEY.

PROCESS AND APPARATUS FOR TESTING WATER FOR DECOLORATION.

No. 814,036.      Specification of Letters Patent.      Patented March 6, 1906.

Application filed June 14, 1905. Serial No. 265,261.

*To all whom it may concern:*

Be it known that I, LÉON GERARD, a subject of the King of Belgium, residing at Brussels, Belgium, have invented a new and useful Process and Apparatus for Testing Water for Decoloration, of which the following is a description.

It is important in water-purifying plants to be able to readily test the purified water to determine its condition with respect to discoloration and also to automatically make a record of tests of this character which can be inspected at any time. The effect of the purifying process upon the water if properly conducted should result in its decoloration and especially in the removal of pigments which produce rays of the yellow and red groups. I utilize this fact to test and record the color of the water by photographic means consisting in passing light through a constant column of the water upon a photographic sensitive surface which, in order to produce a continuous record, is caused to travel at a constant speed. The presence of the yellow or red discoloration in the water prevents the passage of the actinic rays, while the absence of this discoloration permits the passage of such rays which affect the photographically-sensitive surface. The traveling sensitive surface may be in the form of a strip of sensitized paper, which will be carried forward in the apparatus through developing and fixing baths.

In the drawing the figure illustrates diagrammatically one means of carrying out the invention.

1 is a vessel which is open at the top and closed at the bottom, its bottom having a glazed opening 2, through which the light can pass. The water enters the top of the vessel through a pipe 3, connected with the outlet of the water-purifier, and leaves the vessel at its bottom through a pipe 4, which is slightly smaller than the pipe 3, so as to produce a slight flow constantly through the overflow-pipe 5, thus maintaining a constant level of the water. The source of light 6 may be a Nernst lamp or other source giving a constant white light and provided with a suitable reflector to give a projection of the light-rays in parallel lines. Beneath the vessel 1 travels a strip of sensitized paper 7, which may be, and preferably is, fed forward constantly by means of a suitable clockwork. The light from the source 6 passes downwardly through the column of water and through the glazed opening 2 and a suitable lens 8 to focus the light upon the sensitive strip 7, producing a photographic result which is dependent upon the degree of decoloration of the water. The water flows constantly through the vessel 1 from the water-purifier, so that the water in the vessel represents from time to time the condition of the water treated by the purifying operation, and the strip of sensitive paper is fed forward continuously, so as to furnish a continuous record of the degree of decoloration.

What I claim is—

1. The process of testing water for decoloration consisting in passing light through a column or layer of the water upon a photographic sensitive surface, substantially as set forth.

2. The process of testing water for decoloration consisting in causing the water to flow continuously through a layer or column of constant depth, and passing light through said layer or column of water upon a photographic sensitive surface, substantially as set forth.

3. The process of testing water for decoloration consisting in causing the water to flow continuously through a layer or column of constant depth, passing light through said layer or column of water upon a photographic sensitive surface, and changing the sensitive surface with a constant rate of progression, substantially as set forth.

4. An apparatus for testing water for decoloration having in combination a column or layer of water, a source of light located so that rays therefrom will pass through the water, and a photographic sensitive surface upon which such rays are received, substantially as set forth.

5. An apparatus for testing water for decoloration having in combination a layer or column of water, means for causing the water to continuously flow through said layer or column while maintaining a constant depth, a source of light located so as to pass rays therefrom through said layer or column of water, and a photographic sensitive surface upon which such rays are received, substantially as set forth.

6. An apparatus for testing water for decoloration having in combination a layer or column of water, means for causing the water to continuously flow through said layer or column while maintaining a constant depth, a source of light located so as to pass rays therefrom through said layer or column of water, and a traveling photographic sensitive surface upon which such rays are received, substantially as set forth.

This specification signed and witnessed this 12th day of June, 1905.

LÉON GERARD.

Witnesses:
JAS. F. COLEMAN,
JOHN S. LOTSCH.